United States Patent
Clark et al.

[11] B 3,924,453
[45] Dec. 9, 1975

[54] ULTRASONIC TESTING OF TUBING EMPLOYING A SPIRAL WAVE GENERATOR

[75] Inventors: John O. Clark, Pittsburgh; James B. Rafferty, Shaler Twsp., Allegheny County; Donald G. Schindler, Whitehall Borough, all of Pa.

[73] Assignee: United States Steel Corporation, Pittsburgh, Pa.

[22] Filed: May 4, 1973

[21] Appl. No.: 357,131

[44] Published under the Trial Voluntary Protest Program on January 28, 1975 as document no. B 357,131.

[52] U.S. Cl. .............................. 73/67.8 S
[51] Int. Cl.² ........................... G01N 29/04
[58] Field of Search ............ 73/67.8 R, 67.8 S, 67.9, 73/71.5 U; 310/8.3, 8.7

[56] References Cited
UNITED STATES PATENTS

| | | |
|---|---|---|
| 3,183,709 | 5/1965 | Rankin et al. .................... 73/67.9 X |
| 3,218,845 | 11/1965 | Worlton .............................. 73/67.8 |
| 3,379,051 | 4/1968 | Zeutschel et al. .................... 73/67.9 |
| 3,413,843 | 12/1968 | Kortenhoven ................... 73/71.5 U |
| 3,663,842 | 5/1972 | Miller .............................. 73/67.8 X |

OTHER PUBLICATIONS

J. Rooney et al., Ultrasonic Inspection of Small Diameter Thin-wall Tubing, Ultrasonics, April 1966, p. 57–63.

*Primary Examiner*—Richard C. Queisser
*Assistant Examiner*—John P. Beauchamp
*Attorney, Agent, or Firm*—Rea C. Helm

[57] ABSTRACT

Ultrasonic testing of tubing for spirally oriented planar discontinuities in the wall of a tube uses a divergent spiral wave generator. A divergent beam of ultrasonic energy is directed into the wall of the tube to provide spirally oriented shear waves in the wall of the tube. The divergent beam provides angular components which, in the spiral shear mode in the tube, will include a component essentially perpendicular to any spirally oriented defect within an angular range. Defects are determined by detection of reflections of ultrasonic energy from the defect back to the energy source.

5 Claims, 7 Drawing Figures

ULTRASONIC TESTING OF TUBING EMPLOYING A SPIRAL WAVE GENERATOR

This invention relates to ultrasonic testing of pipe and more particularly to an ultrasonic testing system that employs a divergent spiral wave generator for the inspection of seamless tubing.

Ultrasonic bubbler test systems are used for nondestructive testing of seamless tubing. These systems employ water-coupled ultrasonic transducers to generate a shear wave in the tube wall as the tube is spiraled past the transducers by a pipe conveyor. The presence of a rolled-in seam or any planar discontinuity in the tube wall causes part of the generated wave to be reflected and electronic equipment detects, displays and records the reflected signal. In addition, a system actuates an alarm when the signal amplitude exceeds a predetermined level.

Ultrasonic waves are sensitive to the orientation of planar discontinuities, such as rolled-in seams, to the extent that the propagation direction of the wave must be nearly perpendicular, within about 5°, to the plane of the discontinuity if reliable detection is to be achieved. Therefore, the transducer alignment must be such that the required degree of perpendicularity between the direction of propagation of waves and the plane of the discontinuities is maintained. Seams occurring in tubes produced by most mills have an orientation predictably parallel or nearly parallel to the longitudinal axis of the tube. Therefore, an alignment that results in a wave propagation direction perpendicular to the longitudinal axis of the tube is usually adequate for reliable seam detection.

The seams occurring in tubes produced by some types of newer mills may be oriented parallel to the longitudinal axis of the tube or they may take a spiral orientation with spiral angles ranging from 10° to 30° from the longitudinal tube axis. When the rolled-in seam or a planar discontinuity is spirally oriented, no transducer alignment will provide the required beam perpendicularity for all of the possible seam orientation cases. This means that an array of transducers would be required for complete inspection, one transducer for each possible seam orientation angle.

In accordance with our invention, a divergent ultrasonic beam is introduced into the tube to generate a divergent spiral shear wave in the tube wall for detection of defects by reflections of the ultrasonic beam off the defect back to its source. The angle of divergence of the spiral shear wave is sufficient to include a component approximately perpendicular to the spirally oriented defect throughout the range of the expected spiral angularity of the defects.

It is therefore an object of our invention to provide a method for the ultrasonic detection of spirally oriented defects within the wall of a tube using a divergent ultrasonic beam.

Another object of our invention is to provide a method for detecting an angular range of spirally oriented defects.

A further object of our invention is to provide an apparatus for detecting spirally oriented defects within the wall of a tube using a divergent beam of ultrasonic energy to generate spirally oriented shear waves.

These and other objects will become more apparent after referring to the following specification and drawings in which.

Figure 1:
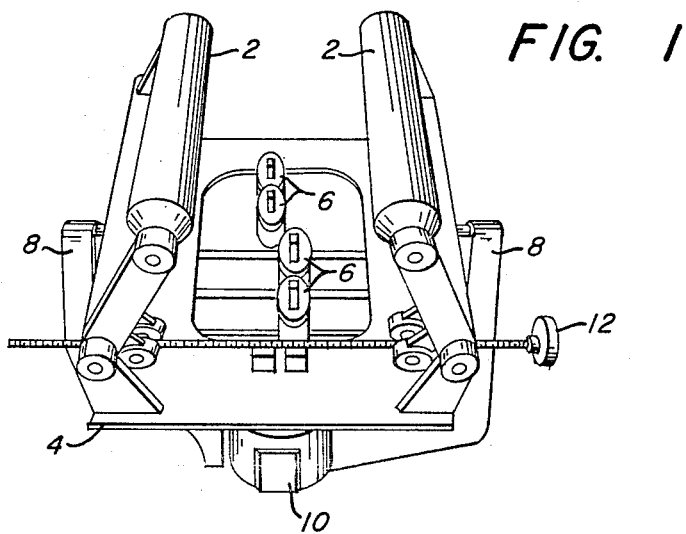
FIG. 1 is a diagrammatic perspective end view of the bubbler head mounting system of the test apparatus.
Figure 2:
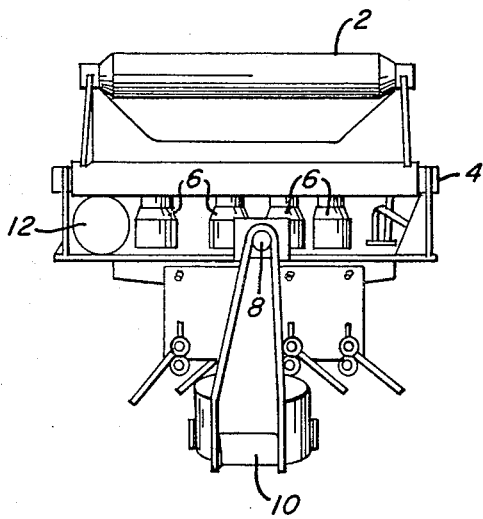
FIG. 2 is a diagrammatic perspective side view of the bubbler head mounting system of the test apparatus.
Figure 7:
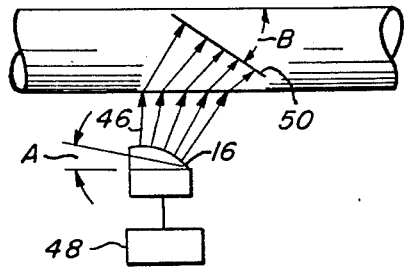
FIG. 7 is a longitudinal sketch illustrating the divergent spirally oriented shear waves in tube testing.

Referring now to FIGS. 1 and 2, reference numeral 2 refers to support rollers which rest on top of the tube to be tested (not shown in FIGS. 1 and 2) and which in turn supports a carriage 4 below the path of travel of the tube. A plurality of vertical bubbler head assemblies 6 are mounted on carriage 4. As the tube is rotated and moved longitudinally for testing, position variations are created in carriage 4 which are followed by bearings 8 permitting carriage 4 to rotate about the transverse axis of the tube and bearing 10 permitting carriage 4 to rotate about the longitudinal axis of the tube. Vertical motion is obtained by containing bearing 10 in a vertical slot. Bubbler heads 6 are mounted for transverse adjustment within carriage 4 and for rotation about the transverse and longitudinal axis of the tube in order to provide proper sonic entry angles for testing. A screw 12 controls the amount of closure of rolls 2 needed to contact the tube to accommodate a wide range of tube diameters. Water lines (not shown) are connected to each bubbler head 6. An ultrasonic test instrument, such as a Sperry UM- 721 Reflectoscope, reference numeral 48 in FIG. 7, is also connected to the bubbler heads. The parts thus far described, except the bubbler head 6, are parts of a conventional ultrasonic testing apparatus.

Figure 3:
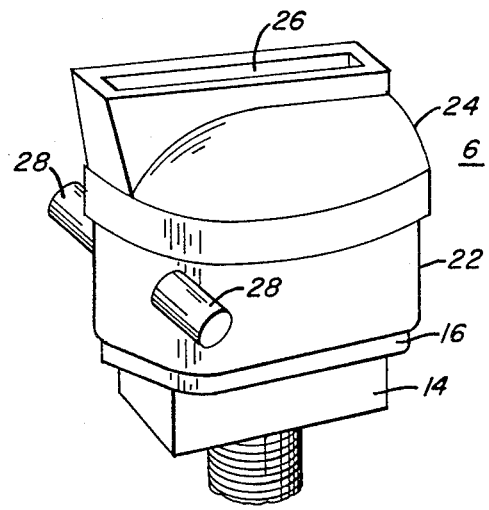
FIG. 3 is a perspective view of a bubbler head assembly.
Figure 4:
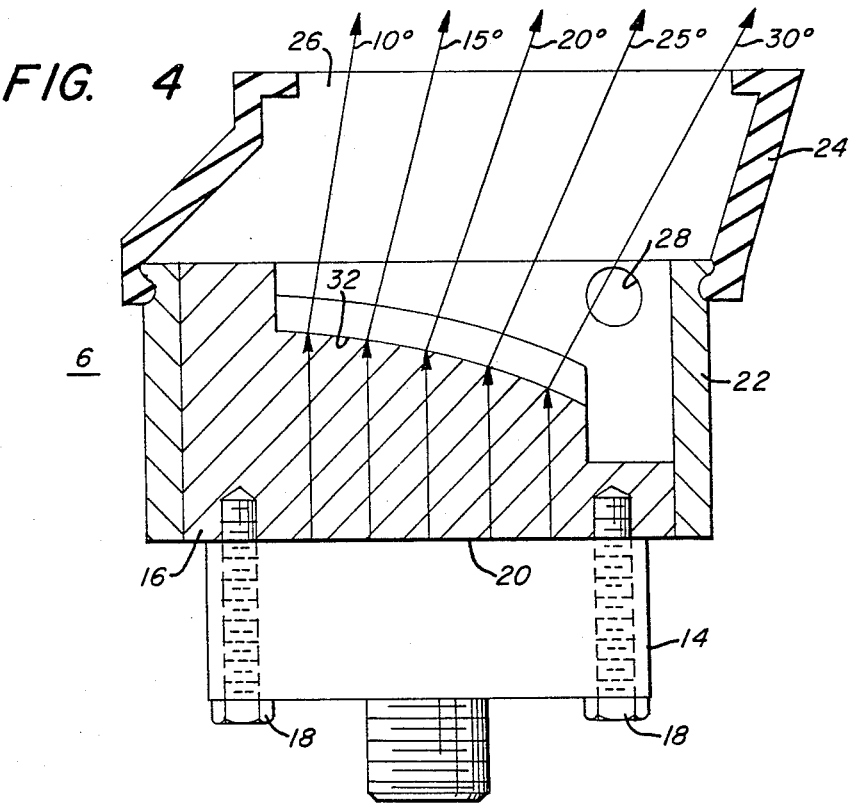
FIG. 4 is a sectional view through the center of the bubbler head assembly along its longitudinal axis.

Referring now to FIGS. 3 and 4, the bubbler head assembly 6 of our invention includes a transducer 14 and a lens 16 which is bolted to transducer 14 by use of bolts 18 and with a layer of silicone grease 20 between lens 16 and transducer 14 to maintain sonic coupling. An elliptical water cylinder 22 surrounds lens 16 and a rubber boot 24 is placed on top of cylinder 22. A water ejection slot 26 is provided on top of boot 24. Water entry ports 28 are provided in the wall of cylinder 22.

Figure 5:
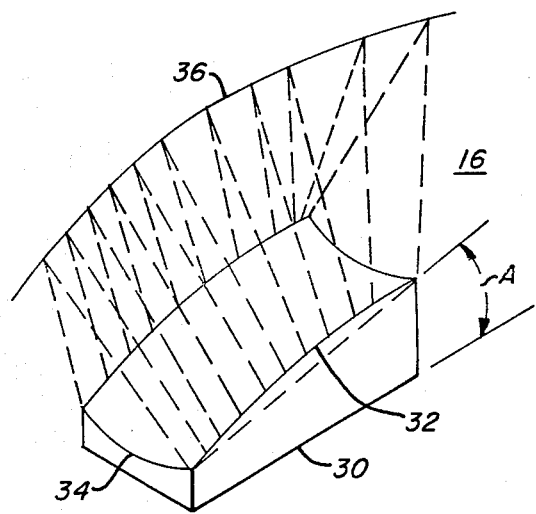
FIG. 5 is a diagrammatic perspective view showing the general shape of the lens.

Referring now to FIG. 5, lens 16 of the bubbler head assembly 6 includes a bottom face 30 which is the face coated with silicone grease 20 and bolted to transducer 14. Lens 16 has a convex curvature 32 of its face along the long dimension of the lens to provide a divergent beam. Lens 16 also has a concave curvature 34 of its face along the short dimension of the lens. The concave surface, depending upon the radius of curvature of the concave surface, focuses the ultrasonic energy along a focal line 36 which is curved because of the convex curvature 32. Curvature 32 is inclined at an angle A with respect to bottom face 30 aligned parallel to the longitudinal axis of the tube under test.

Figure 6:
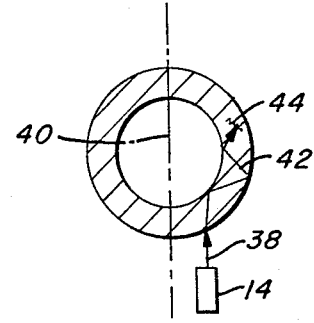
FIG. 6 is a cross-sectional sketch illustrating the shear mode wave in tube testing.

In the ultrasonic testing of tubing for defects, the transducer must first be aligned with the tubing to create shear waves within the test piece. FIG. 6 illustrates the alignment required. Ultrasonic energy 38 leaves transducer 14, enters tube walls in a line which does not pass through the center line 40 so that the beam will be reflected in a shear mode 42. When a defect 44 is encountered, the beam is reflected back along the same path to transducer 14 and electronic devices detect, display and record the echo.

With the transducer aligned to provide shear waves in the tube as shown in FIG. 6, the transducer is also aligned to spiral the waves as shown in FIG. 7. The inclination of the lens by the angle A, FIG. 5 and FIG. 7, results in the divergent beam spiraling through the wall of the tube as shown in FIG. 7. Curvature 32 and angle A are selected to provide perpendicular components within the angular range of the spirally oriented defects. As an example, component 46, the component furthest to the left in the divergent beam leaving lens 16, is refracted upon entering the tube and reflected off the far wall of the tube perpendicular to defect 50 which is spirally oriented by angle B from the horizontal axis of the tube. The beam is then reflected back along the same path for detection by detector 48.

The divergent beam has an angular range selected so that the refraction of the beam from the lens through the liquid couplant and the material of the wall of the tube provides the range of angles desired to detect the spirally oriented defects. FIG. 4 illustrates the placement of components leaving lens 16 for detection of spirally oriented defects inclined at angles of 10°, 15°, 20°, 25° and 30°. The acoustical properties of the lens, couplant and the tube wall material determine the curvature 34 and the angle A. For example, with steel tubing, water as a couplant and a plastic lens inclined (angle A) at an angle of 12° from the horizontal and having the convex surface about 1-1/16 inches long with a radius of curvature of about 4 inches, spirally oriented defects inclined at the angular range of from 10° to 30° from the horizontal axis may be satisfactorily detected.

Since most testing devices are provided with transducer assemblies having a flat radiating surface fixed in a plane parallel to the longitudinal axis of the tube, it is convenient to tilt the lens 16 of our invention at an angle A from the flat radiating surface. The same effect could be achieved if the lens was not inclined with respect to the transducer face, but the transducer radiating surface was inclined by the required angle.

The concave curvature of lens 16 along its small dimension concentrates the divergent beam along the focal line 36. The lens is spaced away from the tube so that the line generally falls on the face of the tube. This reduces the water noise generated by the bubbler and thereby improves the signal water-to-noise ratio.

While one embodiment of our invention has been shown and described, it will be apparent that other adaptations and modifications may be made to our invention.

We claim:

1. Apparatus for detecting spirally oriented defects in the wall of a tube included an angular range from the longitudinal axis of the tube comprising
    a transducer for providing a beam of ultrasonic energy,
    a lens coupled to the transducer with a generally convex radiating surface for shaping the beam of ultrasonic energy in a divergent pattern,
    means for coupling the divergent ultrasonic beam to the wall of the tube,
    said transducer, lens and means for coupling being aligned to generate spirally oriented shear waves in the tube wall when the beam is directed into the tube wall and
    means connected to said transducer for detecting reflections of ultrasonic energy back from a defect in the tube wall.

2. Apparatus according to claim 1 in which said transducer and said lens are aligned away from the tube center line to provide shear waves within the wall of the tube and at an angle to the wall of the tube to provide a spiral pattern to said shear waves.

3. Apparatus according to claim 2 in which said lens is composed of a plastic and said means for coupling includes water as a coupling medium, and said convex surface provides an angular range, which after refraction and reflections from and through the lens, coupling medium and wall of the tube, includes a spiral shear wave component essentially perpendicular to any spirally oriented defect within the angular range.

4. Apparatus according to claim 3 in which said transducer is aligned to provide a beam of ultrasonic energy perpendicular to the longitudinal axis of the tube and the convex surface of said lens is inclined at an angle to the longitudinal axis of the tube.

5. Apparatus according to claim 3 in which the radiating surface of said lens has a generally concave surface at right angles to said convex surface for focusing the divergent beam of ultrasonic energy.

* * * * *

UNITED STATES PATENT OFFICE
CERTIFICATE OF CORRECTION

Patent No. 3,924,453              Dated December 9, 1975

Inventor(s) John O. Clark et al.

It is certified that error appears in the above-identified patent and that said Letters Patent are hereby corrected as shown below:

Column 4, Claim 1, line 2, after "included" insert -- within --.

Signed and Sealed this sixteenth Day of March 1976

[SEAL]

Attest:

RUTH C. MASON
*Attesting Officer*

C. MARSHALL DANN
*Commissioner of Patents and Trademarks*